(12) United States Patent
Oh et al.

(10) Patent No.: US 12,411,263 B2
(45) Date of Patent: Sep. 9, 2025

(54) ULTRA-HIGH-VACUUM CELL WITH INTEGRATED META-OPTICS

(71) Applicant: ColdQuanta, Inc., Boulder, CO (US)

(72) Inventors: Taek Il Oh, Superior, CO (US); Steven Michael Hughes, Louisville, CO (US)

(73) Assignee: ColdQuanta, Inc., Boulder, CO (US)

( * ) Notice: Subject to any disclaimer, the term of this patent is extended or adjusted under 35 U.S.C. 154(b) by 704 days.

(21) Appl. No.: 17/752,069

(22) Filed: May 24, 2022

(65) Prior Publication Data

US 2023/0070293 A1 Mar. 9, 2023

Related U.S. Application Data

(60) Provisional application No. 63/241,626, filed on Sep. 8, 2021.

(51) Int. Cl.
*G02B 1/00* (2006.01)
*G02B 3/00* (2006.01)
(Continued)

(52) U.S. Cl.
CPC ............ *G02B 1/002* (2013.01); *G02B 3/00* (2013.01); *G02B 5/1809* (2013.01);
(Continued)

(58) Field of Classification Search
CPC ........ G21K 1/06; G02B 1/002; G02B 5/1809; G02B 5/1871; G02B 7/007
See application file for complete search history.

(56) References Cited

U.S. PATENT DOCUMENTS

| 7,126,112 | B2 * | 10/2006 | Anderson | G21K 1/006 250/251 |
| 2015/0200029 | A1 * | 7/2015 | Hughes | G21K 1/006 250/251 |

(Continued)

FOREIGN PATENT DOCUMENTS

WO WO-2019122924 A1 * 6/2019 ............. G21K 1/006

OTHER PUBLICATIONS

Hsu et al., "Atom Trapping with Metasurface Optics," in Conference on Lasers and Electro-Optics, OSA Technical Digest (Optica Publishing Group, May 2020), paper JW2A. 12, https://doi.org/10.1364/CLEO_AT.2020.JW2A.12. (Year: 2020).*

(Continued)

*Primary Examiner* — Nicholas R. Pasko
(74) *Attorney, Agent, or Firm* — Young Basile Hanlon & MacFarlane, P.C.

(57) ABSTRACT

Metamaterial optics are integrated with vacuum-boundary walls of ultra-high-vacuum (UHV) cells to manipulate light in a manner analogous to various bulk optical elements including lenses, mirrors, beam splitters, polarizers, waveplate, wave guides, frequency modulators, and amplitude modulators. For example, UHV cells can have metasurface lenses formed on interior and/or exterior surfaces on one or more of their vacuum-boundary walls. Each metasurface lens can include a plurality of mesas with the same height and various cross-sectional dimensions. The uses of metasurface lenses allows through-going laser beams to be expanded, collimated or focused without using bulky refractive optics. Each metasurface lens can be formed on a cell wall using photolithographic or other techniques.

20 Claims, 8 Drawing Sheets

(51) Int. Cl.
    *G02B 5/18*    (2006.01)
    *G21K 1/06*    (2006.01)
    *G02B 7/00*    (2021.01)

(52) U.S. Cl.
    CPC ............. *G02B 5/1871* (2013.01); *G21K 1/06*
                        (2013.01); *G02B 7/007* (2013.01)

(56) References Cited

U.S. PATENT DOCUMENTS

2017/0359888 A1* 12/2017 Imhof ...................... H05H 3/02
2020/0120785 A1*  4/2020 Eckel ...................... H05H 3/02
2020/0386581 A1* 12/2020 Hoyt ..................... G02B 6/4206
2022/0327414 A1* 10/2022 Bohn ..................... G06N 10/40
2023/0169385 A1   6/2023 Meinert et al.

OTHER PUBLICATIONS

McGehee et al., "Magneto-optical trapping using planar optics," Jan. 29, 2021 New J. Phys. 23 013021, https://doi.org/10.1088/1367-2630/abdce3. (Year: 2021).*

Shen et al., "On-chip optical levitation with a metalens in vacuum," arXiv:2107.09659 [physics.optics], https://doi.org/10.48550/arXiv.2107.09659, Jul. 20, 2021. (Year: 2021).*

Tkachenko et al., "Optical trapping with planar silicon metalenses," Optics Letters. pp. 3224-3227. ISSN 0146-9592, https://doi.org/10.1364/OL.43.003224. (Year: 2018).*

Zhu et al., "A dielectric metasurface optical chip for the generation of cold atoms," Sci. Adv. 2020; 6 : eabb6667 Jul. 29, 2020. (Year : 2020).*

* cited by examiner

Light Manipulation Process 800

First Light is Manipulated as it Enters UHV Cell
Using First Metamaterial Optic in or on First Wall of UHV Cell
801

Second Light Begins Exiting UHV Cell in Response to Entrance of First Light 802

Second Light is Manipulated as it is Exiting UHV Cell
Using Second Metamaterial Optic in or on Second Wall of UHV Cell
803

FIG. 8

ULTRA-HIGH-VACUUM CELL WITH INTEGRATED META-OPTICS

BACKGROUND

In ultracold matter physics, a vapor or condensate of atoms can be confined within an ultra-high vacuum (UHV) cell. Laser beams can be used to cool the atoms so that the motion and quantum states of individual atoms can be controlled using laser beams. Lasers and photodetectors (used to characterize fluorescence from atoms as well as the effects on laser light as it exits a cell) are typically located outside the cell so cell walls must be transparent (to the laser frequency or frequencies) or else include transparent windows.

Depending on the application, light enroute to and from a UHV cell may need to undergo a variety of transformations. Beams may be focused, collimated, expanded, split, combined, reflected etc. Polarization may be imposed or the polarization may be changed. The light may be transferred from free space to an optical fiber or waveguide or vice versa. Such transformations can be implemented using bulk optics, lenses, mirrors, beam splitters, polarizers, gratings, waveguides, waveplates, holograms, etc.

The incorporation of such bulk optics can contribute substantially to the size of ultracold matter physics systems. To further the development and commercialization of ultracold matter physics, it is desirable to reduce the size, weight, and power (SWaP) requirements of the enabling systems.

BRIEF DESCRIPTION OF THE DRAWINGS

FIG. 8 is a flow chart of a light manipulation process implementable in the ultracold atom system of FIG. 7 and in other systems.

DETAILED DESCRIPTION

Figure 1:
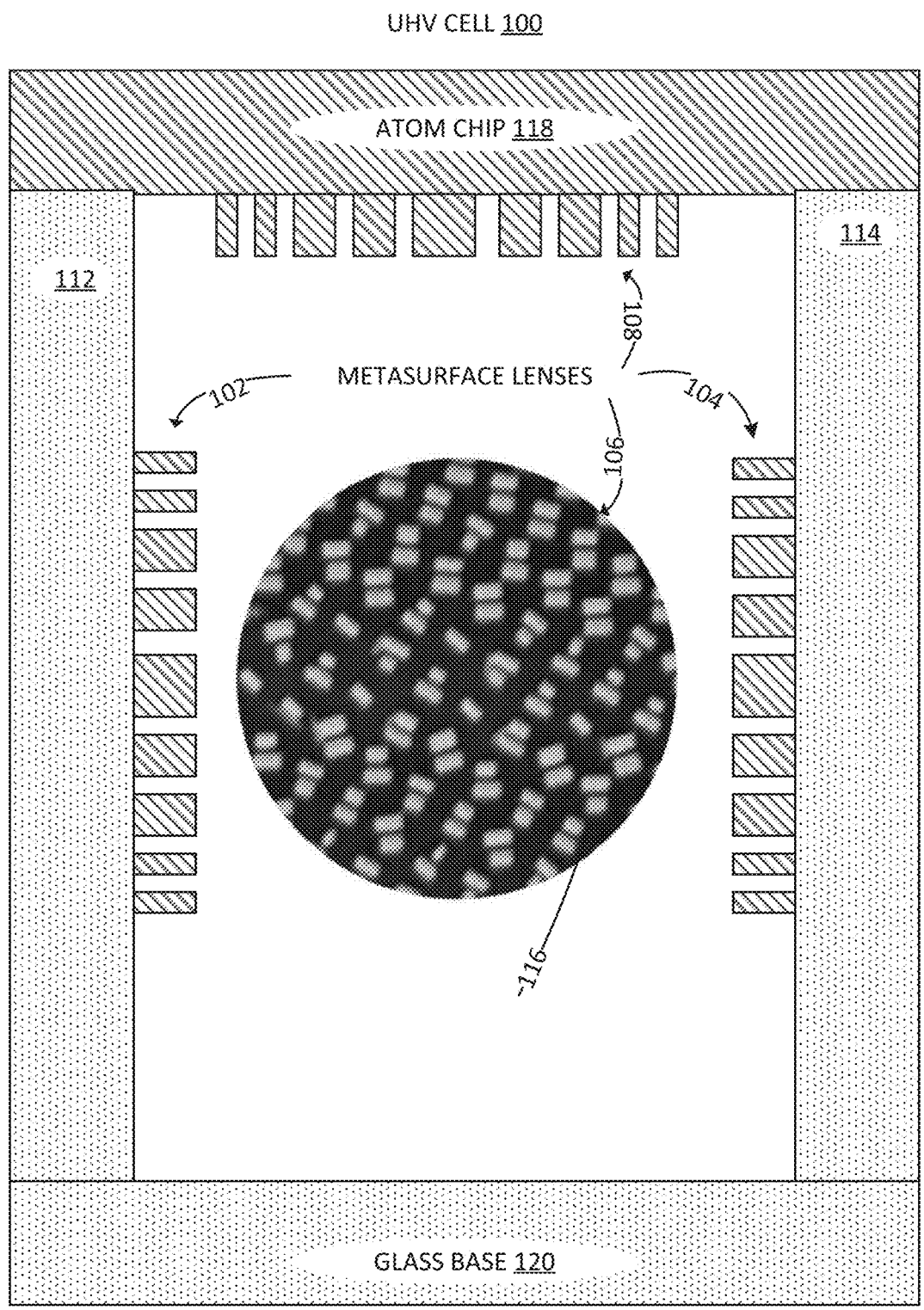
FIG. 1 is a schematic elevation view (with a front vacuum boundary wall removed) of a UHV cell with metasurface lenses formed on interior surfaces of its vacuum boundary walls.

The present invention provides a UHV cell with one or more metamaterial optics elements (e.g, lenses) formed on and/or in the cell walls, thus reducing or eliminating the use of bulkier refractive lenses and enabling smaller and more portable ultracold matter systems. For example, a UHV cell 100, shown in FIG. 1, includes metasurface lenses 102, 104, 106, and 108 formed respectively on a left sidewall 112, a right sidewall 114, rear sidewall 116, and an atom-chip wall 118. A fifth metasurface lens is formed on a front sidewall (not shown). Atom chip 118 and glass base 120 are bonded to all four sidewalls.

FIG. 1 is not to scale as metasurface lens feature dimensions are subwavelength, and thus nanoscale, at least for lenses designed for visible light. Each metasurface lens is circular and includes a distribution of mesas that are formed photolithographically so that the mesas are the same height, but can vary in the size, shape, and orientation of their cross sections. An enlarged portion of an image of an actual metasurface lens is used in FIG. 1 to represent metasurface lens 106. The mesas of metasurface lens 106 have rectangular cross sections with various lengths, widths and orientations.

The image used to represent metasurface lens 106 was derived from FIG. 2b of Wei Ting Chen et al. "A broadband achromatic metalens for focusing and imaging in the visible", Nature Nanotechnology, Vol. 13, March 2018, pp 220-226. This article discloses a metasurface lens that achieves diffraction limited achromatic focusing from 470 nanometers (nm) to 670 nm, which is most of the visible light range. The titanium oxide ($TiO_2$) mesas are 600 nm tall and evenly spaced at 400 nm. The cross sections are rectangular, with the smallest being 100 nm by 70 nm, and the largest being 230 nm by 170 nm. The range from 470 nm to 670 covers some of but not all of the range of wavelengths of interest in ultracold-matter physics. For this reason, multiple metasurface lenses can be used collectively to accommodate ranges from violet to into the near infrared.

Atom chip 118 is used to generate and control magnetic fields within UHV cell 100. Metasurface lens 108 can be formed using a pulsed pico-second or femto-second laser to define its mesas by removing material between the mesas. Atom chip 118 is based on a silicon substrate that is transparent to infrared light. Accordingly, metasurface lens 108 is used for optical access by a near infrared (e.g., 1040 nm) laser.

Figure 2:
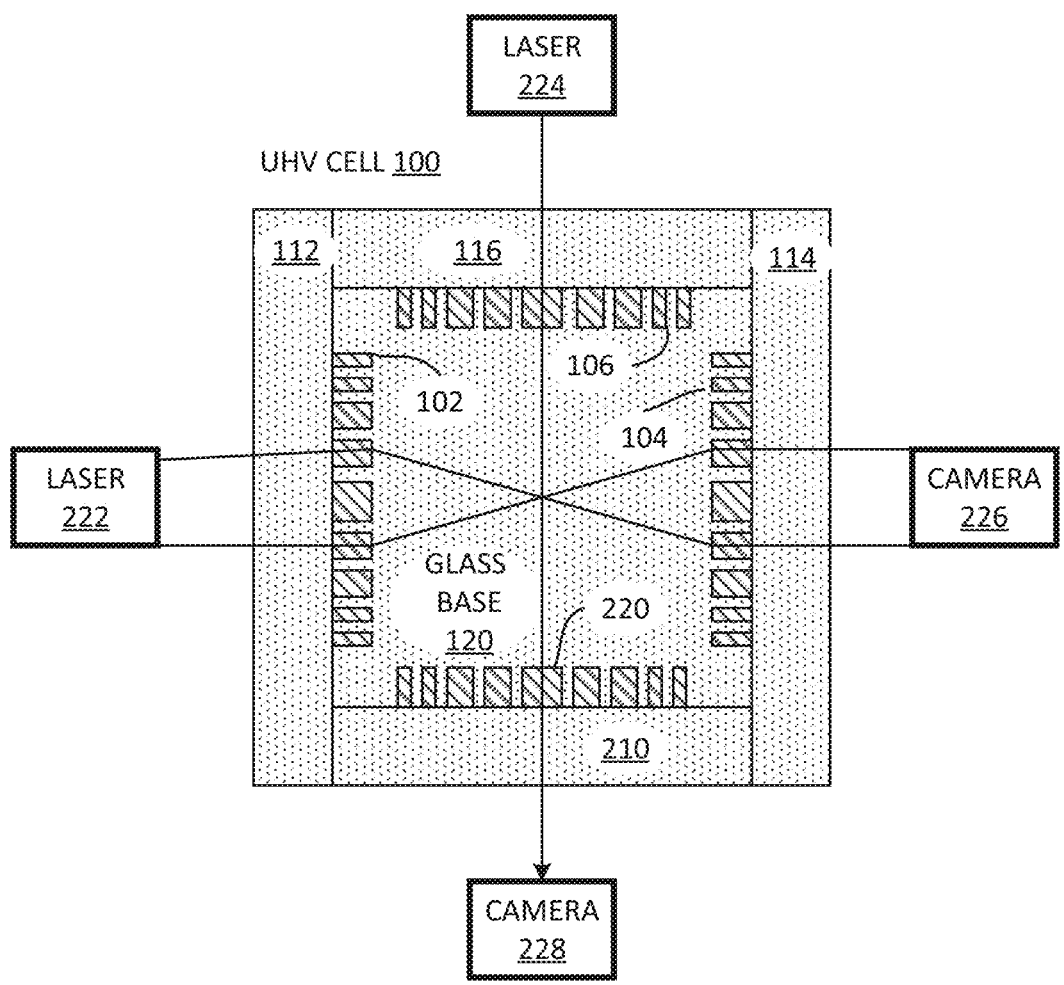
FIG. 2 is a schematic plan view of an ultracold matter system including the UHV cell (with an atom chip wall) of FIG. 1.

An ultracold atom system 200 is shown in FIG. 2 including UHV cell 100 with sidewall 210 and metasurface lens 220 formed thereon. Two lasers 222 and 224 are shown along with two cameras 226 and 228 used to detect spectra of light exiting cell 100. To accommodate more lasers, e.g., to cool, trap, move, excite atoms, more than one lens or other optical element can be formed on a wall; also, cells with more sides (e.g., hexagonal cells) can be used. Suspended inner walls may also be erected.

Figure 3:
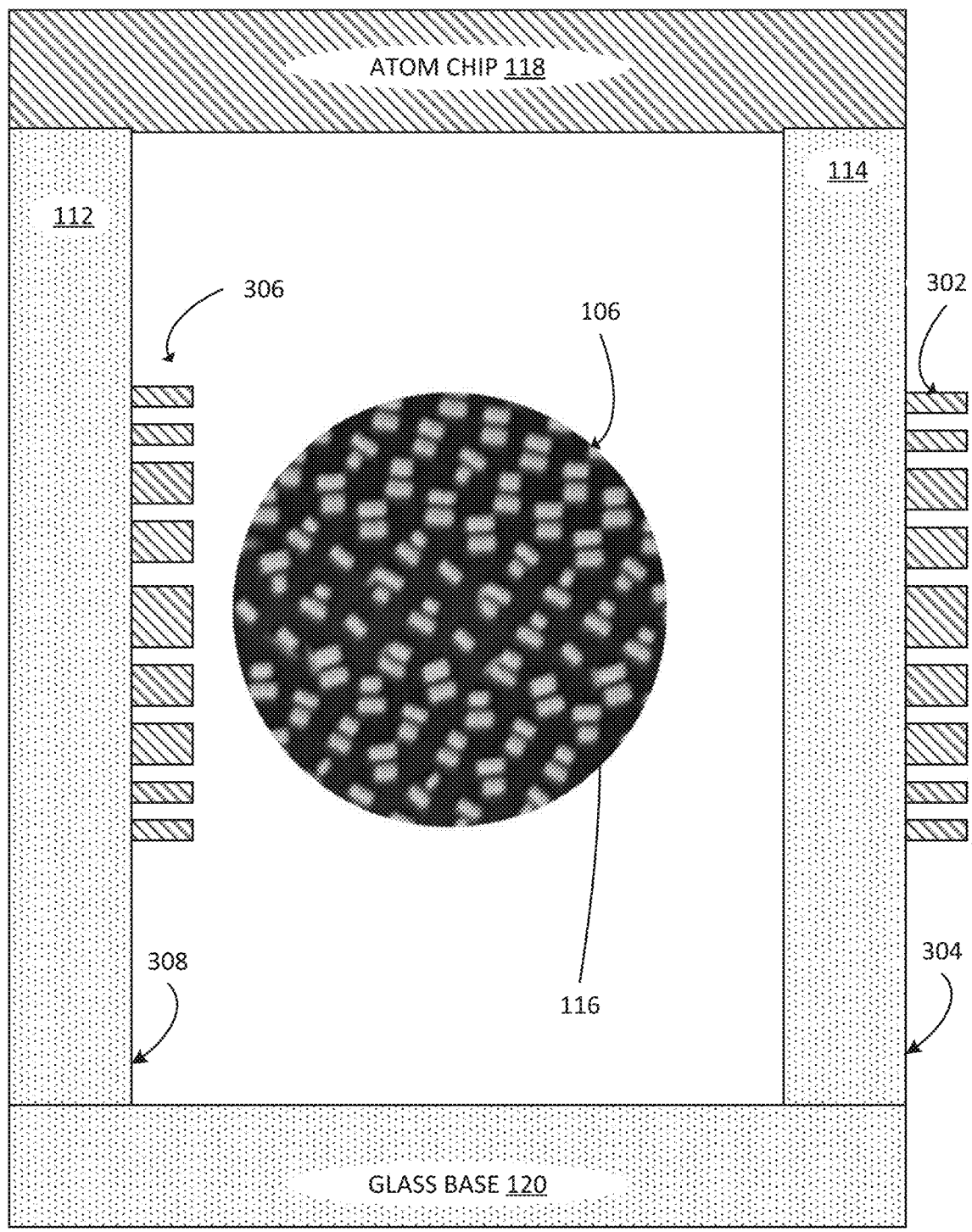
FIG. 3 is a schematic elevation view (with a front sidewall removed) of an UHV cell with metasurface lenses formed on interior and exterior surfaces of vacuum boundary walls.
Figure 4:
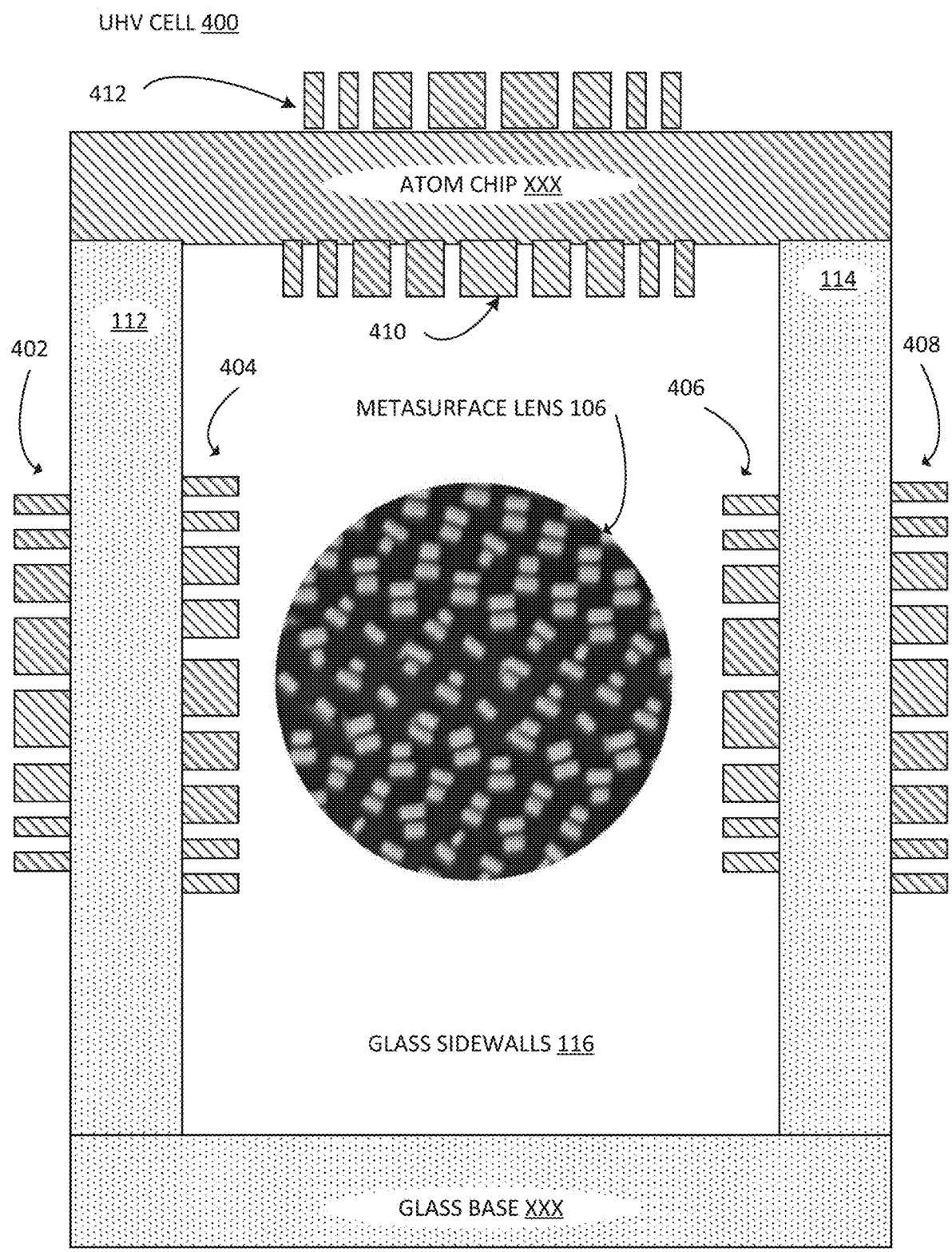
FIG. 4 is a schematic elevation view (with a front wall removed) of an UHV cell with metasurface lenses formed on interior and exterior surfaces of five vacuum-boundary walls.

In cell 100, metasurface lenses are formed on the interior surfaces of an assembled UHV cell. In other embodiments, the lenses are formed before cell walls are bonded to each other. Alternatively, metasurface lenses can be formed on exterior surfaces of walls. In the case of Cell 300, FIG. 3, a metasurface lens 302 is formed on an exterior wall surface 304 while another metasurface lens 306 is formed on an interior surface 308. In the case of cell 400, FIG. 4, metasurface lenses 402, 404, 406, 408, 410, and 412 are formed on interior and exterior surfaces of atom chip 118 and each sidewall.

Figure 5:
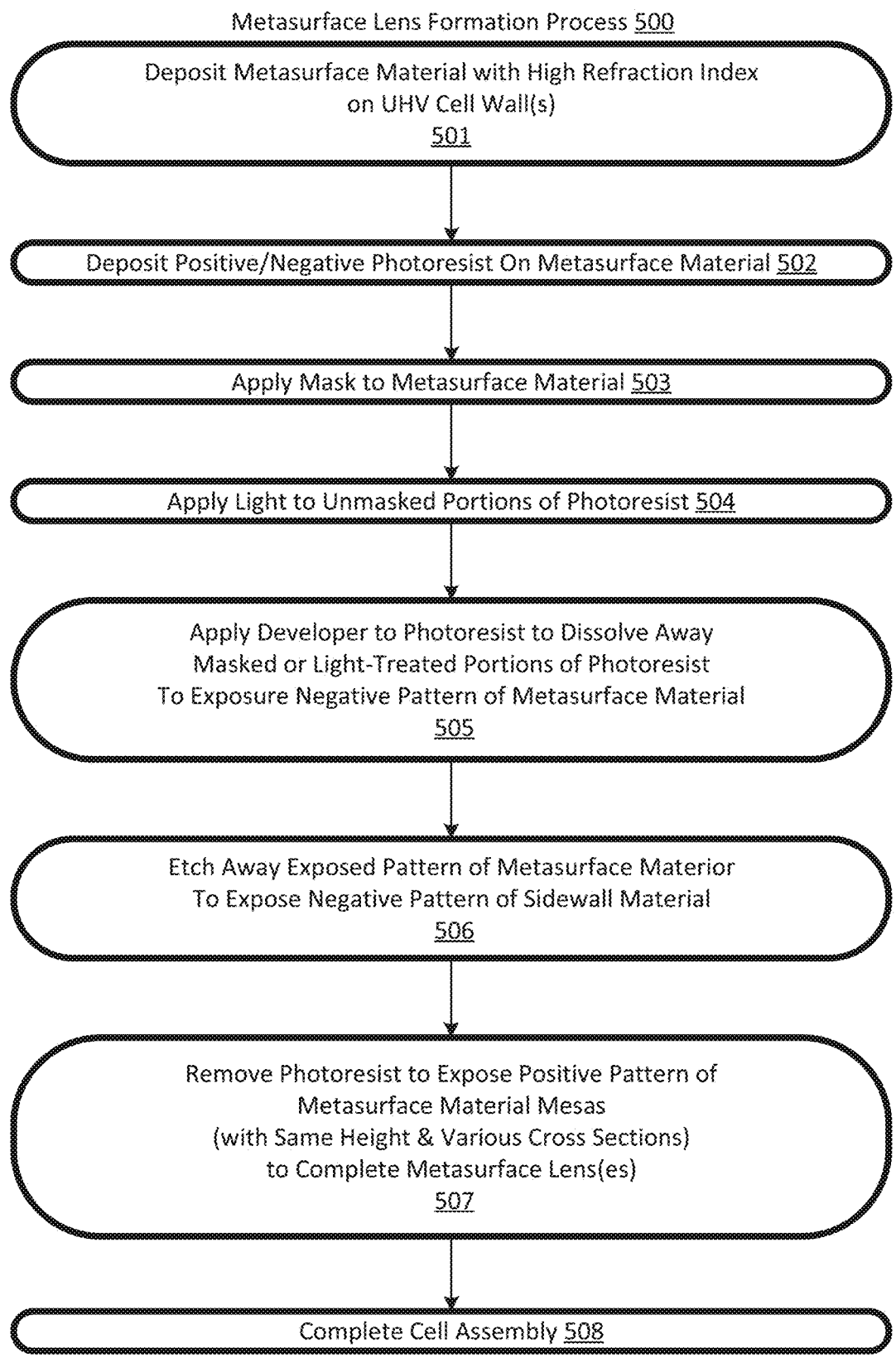
FIG. 5 is a flow chart of a metamaterial optics formation process.

A metasurface lens formation process 500 is flow charted in FIG. 5. Depending on the variation, the process can be conducted on an interior wall or an exterior wall, and on a wall that has yet to be bonded to another wall or on a wall that has been bonded to one or more other cell walls. At 501, metasurface material with a high refractive index is deposited, grown, or formed on a cell wall. At 502, photoresist is deposited on the metasurface material. The photoresist may be a positive photoresist or a negative photoresist. At 503, a patterned mask is applied to the photoresist so that some of the photoresist is covered and some is exposed.

At 504, light is applied to the unmasked areas of photoresist. In the case where the photoresist is positive, the light degrades the exposed photoresist; in the case where the photoresist is negative, the light strengthens (e.g., polymerizes or cross-links) the exposed photoresist. At 505, developer (solvent) is applied to dissolve away the weakened (in the case of the positive photoresist) or the non-strengthened (negative photoresist) regions of the photoresist, thus exposing a negative pattern of the metasurface material. At 506, the exposed negative pattern of metasurface material is etched away so as to expose a negative pattern of glass or other bulk material of the cell wall. At 507, remaining photoresist is removed, uncovering a final positive pattern of metamaterial mesas (aka, pillars). In some embodiments. In a case where a metasurface lens is formed on an interior surface of a cell wall, bonding of at least one cell wall may be required to complete the cell at 508.

Process 500 is basically a classical lithographic procedure. The invention provides for alternatives including various types of nanoimprint lithography, e.g., thermoplastic nanoimprint lithography, photo nanoimprint lithography, and resist-free direct thermal nanoimprint lithography. Other processes include direct laser etching.

Figure 6:
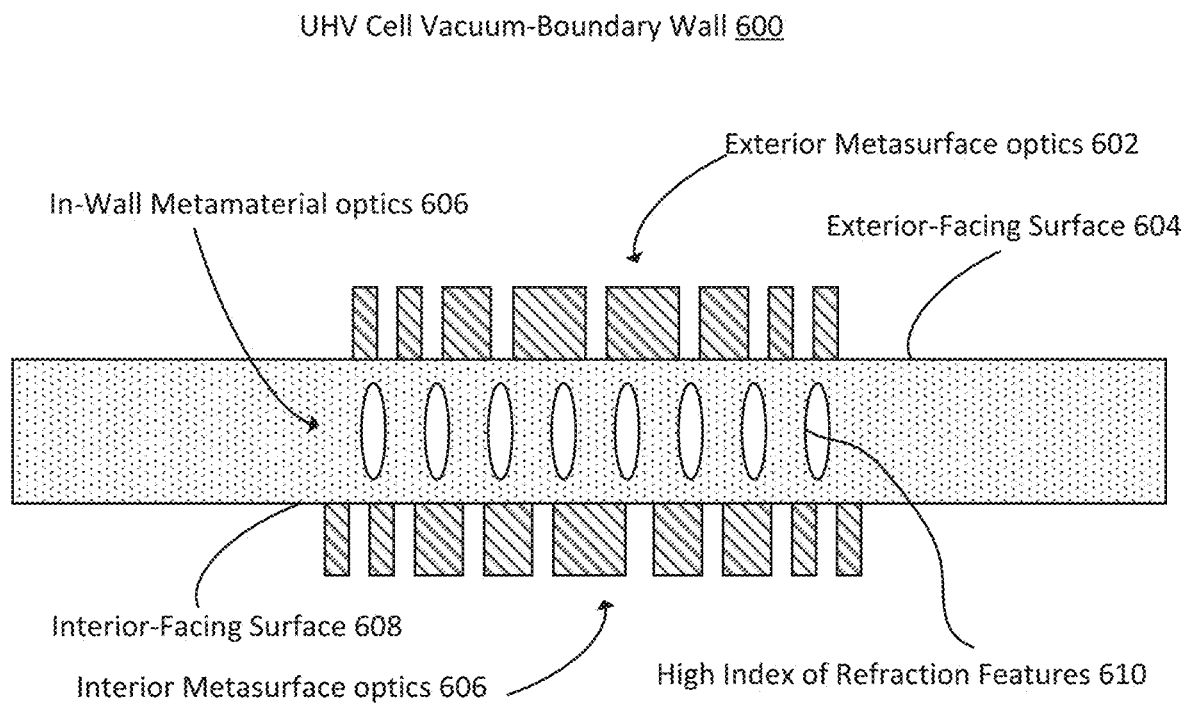
FIG. 6 is a schematic illustration of a UHV cell wall with metamaterial optics formed in or on the wall body and surfaces.

Since each vacuum-boundary wall has an exterior-facing surface and an interior-facing surface, metasurface lens can be arranged in series to accomplish more complex transformations than can be accomplished by a single metasurface optical element. More complex functions can be achieved by adding a third optical element in the form of an in-wall metamaterial lens as shown in FIG. 6. Finally, metamaterial optics can be combined with bulk optics, e.g., a metasurface lens can be formed in or on curved surfaces of a cell wall.

As shown in FIG. 6, a vacuum-boundary wall 600 of a UHV cell has metasurface optics 602 formed on an exterior-facing surface 604 of wall 600, metasurface optics 606 on an interior-facing surface 608 of wall 600, and metamaterial optics formed within wall 600. In-wall metamaterial optics can be designed using pico-second or femto-second laser pulses to modify the bulk material of the wall locally to define high index of refraction features 610. Features 610 are spaced, on the average and between nearest neighbors, less than one-wavelength apart. The high-peak-power laser pulses transform the wall material, while the brevity of the pulses ensures that the transformations are highly localized.

Figure 7:
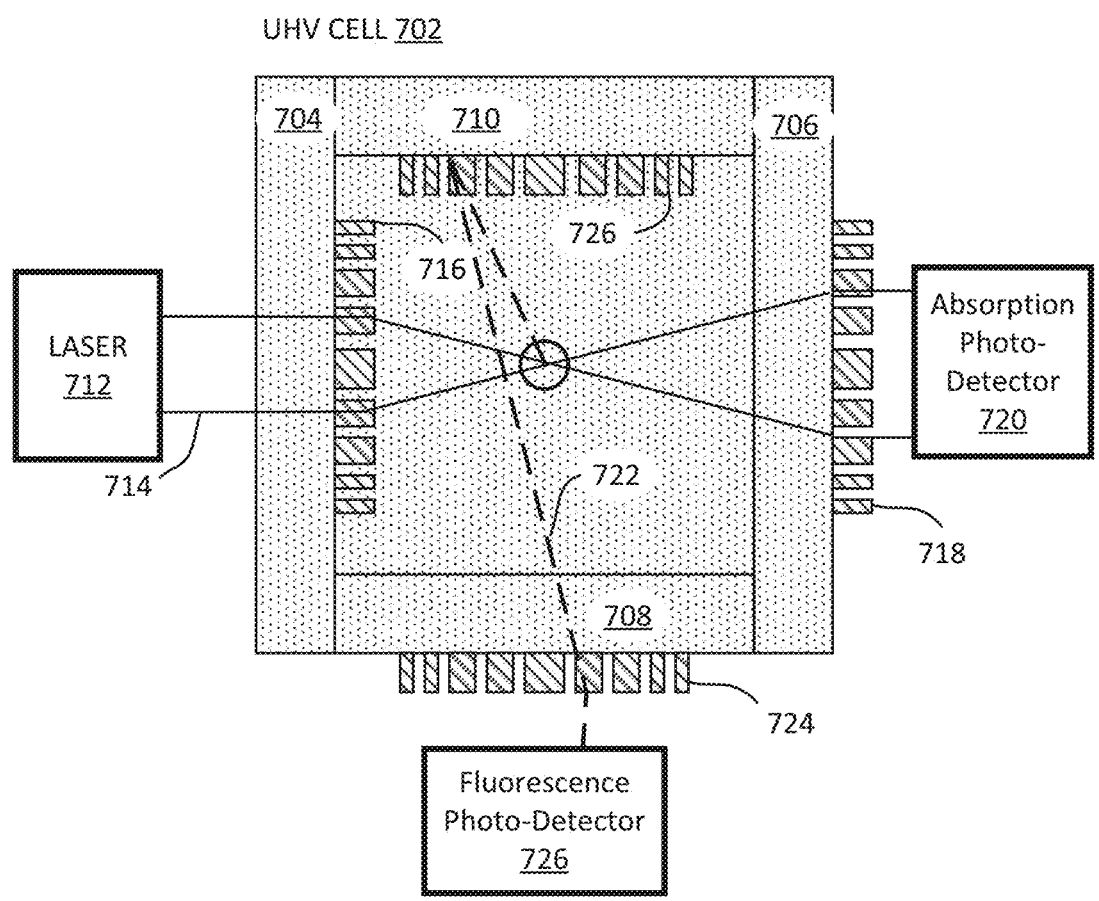
FIG. 7 is a schematic illustration of an ultracold atom system showing paths for light entering and exiting a UHV cell.

As shown in FIG. 7, an ultracold atom system 700 includes a UHV cell 702 with plural vacuum-boundary walls, including walls 704, 706, 708, and 710. A laser system 712 transmits a laser beam 714 through wall 704 so that it is focused by interior-facing metasurface lens 716. As the laser beam passes the focal plane, it begins its exit by diverging. Once the laser light passes through wall 706, it is collimated by metasurface lens 718. The collimated light then is detected by photodetector 720, which is arranged to detected absorption of beam 714 by the contents (e.g., rubidium 87 atoms) of UHV cell 702.

The contents of cell 702 respond to the absorption of the entering light by emitting fluorescence 722 shortly after. The fluorescence is omnidirectional so some passes directly through wall 708, metasurface lens to a fluorescence photodetector 726. However, some fluorescence begins exiting in the opposite direction. This fluorescence is retro-reflected by metasurface mirror 726 so that the reflected fluorescence exits through wall 708 and metasurface lens 724 to reach fluorescence photodetector 726 (which counts incident fluorescence photons).

A light manipulation process 800, flow charted in FIG. 8, is implementable in ultracold atom system 700 and in other systems. At 801, first light is manipulated as it enters a UHV cell using a first metamaterial optical in or on a first wall of the UHV cell. At 802, second light begins exiting the UHV cell in response to the entrance of the first light. There are two examples of this in FIG. 7: the continuation of the incoming laser light as it passes the focal plane or point; and the emission of fluorescence. At 803, the second light is manipulated as it is exiting the UHV cell using a second metamaterial optic in or on a second wall of the UHV cell. Again, there are plural examples, reflection by the mirror and collimation by the lens.

In an example, a metasurface lens is coupled with volume holographic gratings written into the same or nearby bulk transmissive structures. The metamaterial can be formed near the surface or within the bulk of another material through sub wavelength features formed through optical damage/selective refractive index changes similar to holography. The metamaterial can be formed into or onto the surface of the substrate material utilizing focused lasers to either thermally or through optical processes chemically excite localized reactions effectively forming nanoscale refractive index structures or changes onto or into the surface using photochemical growth or etching, an electrophoretic like localized high potential driven ion migration, or a local forced thermal diffusion on a subwavelength scale.

In an embodiment, the metamaterial is formed into or onto the surface of the substrate (cell wall) material utilizing focused lasers to either thermally or through optical processes chemically excite localized reactions effectively forming nanoscale refractive index structures or changes onto or into the surface. Formation can include photochemical growth or etching, an electrophoretic like localized high potential driven ion migration, or a local forced thermal diffusion on a subwavelength scale.

In an embodiment, metamaterial is used with a nanotextured/nanostructured surface over a clear aperture of a beam to improve reflection and reduce a tendency for alkali metals to sorb onto the surface of the optical face thereby degrading optical performance. In an embodiment, metasurface patterning forms or is part of a diffractive element. In an embodiment, a metasurface pattern is subsequently layered or iterated such as by then depositing/flowing a layer of low refractive index material to cover, followed by high refractive index thin film then iterating the patterning process. In an embodiment, a thin film metasurface material is selectively reacted such as with oxygen, nitrogen, etc., after patterning to change its optical properties, such as changing its bulk refractive index or adding an effective stepped or gradient refractive index.

In an embodiment, a metasurface lens is utilized as a reflective lens off of one or multiple metalized, high-reflectivity coated, or other reflective surfaces. For example, the lens can be on internally mounted turning mirrors to turn them into lenses as well without having to polish millimeter scale or smaller lenses. In an embodiment, one or a series of metasurface lens or other optical components are suspended within or outside of the vacuum chamber to enable free-space like beam manipulation with minimal consumed volume and mass of optics.

Herein, an "atom chip" is a microfabricated, integrated device in which electric, magnetic and optical fields can confine, control, manipulate and/or interrogate cold atoms. The use of an atom chip as a UV cell wall is covered in U.S. Pat. No. 7,126,112 by Dana Zachary Anderson and Jacob G. J. Reichel entitled "Cold Atom System with Atom Chip Wall". In the case of an atom chip wall, the atom chip functions as a feedthrough as features on the interior-facing surface of an atom chip are couple by vias to contacts on the exterior facing surface of the atom chip.

Herein, "ultra-high vacuum" and "UHV" refer to a pressure below $10^{-9}$ Torr. "Ultracold" refers to temperatures below one microkelvin. A "vacuum-boundary wall" has an interior facing surface adjacent a confined vacuum and an exterior facing surface facing a higher ambient pressure.

Metamaterials are composed of periodic subwavelength metallic/dielectric structures that resonantly couple to the electric and magnetic fields of the incident electromagnetic waves, exhibiting unprecedented properties which are most typical within the context of the electromagnetic domain. Thus, a "metamaterial optic" (aka, "meta-optic") is a structure that uses constructive and destructive interference to modify or manipulate light. A "metasurface" is a metamaterial structure for in or on a surface. A "metasurface lens" is a metasurface that mimics and/or extends the capabilities of refractive lenses.

Herein, the "average minimum inter-feature separation" is determined as follows. For each high index of refraction feature, determine the minimum separation between that feature and its nearest neighbor among the remaining high index of refraction features. Then, average all the minimum separations across all of the high index of refraction features of the optical element under consideration.

Herein, art labelled "prior art, if any, is admitted prior art; art not labelled "prior art", if any, is not admitted prior art. The illustrated embodiments, variations thereupon and modifications thereto are provided for by the present invention, the scope of which is defined by the accompanying claims.

What is claimed is:

1. An ultra-high vacuum (UHV) cell system comprising:
   plural vacuum boundary walls separating a UHV interior from a higher pressure exterior, each of the walls having an interior-facing surface facing the UHV interior and an exterior-facing surface, the UHV interior having a pressure less than $10^{-9}$ Torr; and
   a first metasurface lens formed on an interior-facing surface or an exterior-facing surface of a first vacuum boundary wall of the vacuum boundary walls with at least a portion of the first metasurface lens being integral with or in contact with the interior-facing surface or exterior-facing surface on which the first metasurface lens is formed.

2. The UHV cell system of claim 1, wherein the first metasurface lens is formed on an exterior-facing surface of the first vacuum boundary.

3. The UHV cell system of claim 1, further comprising a second metasurface lens formed on an interior-facing surface or an exterior-facing surface of a second vacuum boundary wall of the vacuum boundary walls, wherein the interior-facing surface or exterior-facing surface on which the second metasurface lens is formed is substantially perpendicular to or substantially parallel with the interior-facing surface or the exterior-facing surface on which the first metasurface lens is formed.

4. The UHV cell system of claim 1, wherein the interior-facing surface or the exterior-facing surface on which the first metasurface lens is formed is a curved surface.

5. The UHV cell system of claim 1, wherein the first vacuum boundary wall is an atom chip.

6. The UHV cell system of claim 5, wherein the first metasurface lens transmits infrared light.

7. The UHV cell system of claim 1, wherein the first metasurface lens is configured to focus, expand, collimate, change a direction of propagation, or modify a polarization associated with at least a portion of an optical wave.

8. The UHV cell system of claim 7, wherein the first metasurface lens comprises a plurality of mesas, and each mesa of the plurality of mesas comprises
   a length along a first axis,
   a width along a second axis that is perpendicular to the first axis, and
   a height along a third axis that is perpendicular to each of the first axis and the second axis.

9. The UHV cell system of claim 1, further comprising a metamaterial optical element formed within the first vacuum boundary wall.

10. The UHV cell system of claim 9, wherein the metamaterial optical element comprises a plurality of features, wherein each feature of the plurality of features has a respective index of refraction that is different from an index of refraction of a portion of the first vacuum boundary wall.

11. The UHV cell system of claim 1, wherein the first metasurface lens includes a plurality of mesas.

12. The UHV cell system of claim 11, wherein the mesas are the same height, an average distance between mesas and their respective nearest neighbor mesas being less than one micron.

13. The UHV cell system of claim 11, wherein each mesa of the plurality of mesas comprises a respective rectangular cross section.

14. The UHV cell system of claim 11, wherein the first metasurface lens comprises a first layer of material associated with a first refractive index formed on the interior-facing surface or the exterior-facing surface and a second layer of material associated with a second refractive index formed on the first layer of material, where the first refractive index is different from the second refractive index.

15. The UHV cell system of claim 1, wherein the first metasurface lens is formed on an interior-facing surface of the first vacuum boundary wall.

16. The UHV cell system of claim 15, further comprising a second metasurface lens formed on the interior-facing surface of the first vacuum boundary wall.

17. The UHV cell system of claim 15, further comprising a second metasurface lens formed on an exterior-facing surface of the first vacuum boundary wall.

18. The UHV cell system of claim 1, further comprising a second metasurface lens formed on a second vacuum boundary wall of the UHV cell.

19. The UHV cell system of claim 18, wherein the first vacuum boundary wall and the second vacuum boundary wall are parallel to each other.

20. The UHV cell system of claim 19, wherein the first metasurface lens is formed on an interior-facing surface of the first vacuum boundary wall and the second metasurface lens is formed on an exterior-facing surface of the second vacuum boundary wall.

* * * * *